United States Patent
Kim et al.

(10) Patent No.: US 10,796,571 B2
(45) Date of Patent: Oct. 6, 2020

(54) METHOD AND DEVICE FOR DETECTING EMERGENCY VEHICLES IN REAL TIME AND PLANNING DRIVING ROUTES TO COPE WITH SITUATIONS TO BE EXPECTED TO BE OCCURRED BY THE EMERGENCY VEHICLES

(71) Applicant: StradVision, Inc., Gyeongsangbuk-do (KR)

(72) Inventors: Kye-Hyeon Kim, Seoul (KR); Yongjoong Kim, Gyeongsangbuk-do (KR); Hak-Kyoung Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Dongsoo Shin, Gyeonggi-do (KR); Donghun Yeo, Gyeongsangbuk-do (KR); Wooju Ryu, Gyeongsangbuk-do (KR); Myeong-Chun Lee, Gyeongsangbuk-do (KR); Hyungsoo Lee, Seoul (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 16/739,349

(22) Filed: Jan. 10, 2020

(65) Prior Publication Data
US 2020/0250974 A1 Aug. 6, 2020

Related U.S. Application Data

(60) Provisional application No. 62/799,532, filed on Jan. 31, 2019.

(51) Int. Cl.
*G08G 1/0965* (2006.01)
*G08G 1/04* (2006.01)
(Continued)

(52) U.S. Cl.
CPC ....... *G08G 1/0965* (2013.01); *G01C 21/3691* (2013.01); *G05D 1/0276* (2013.01); *G08G 1/04* (2013.01); *G05D 2201/0213* (2013.01)

(58) Field of Classification Search
CPC ............... G08G 1/205; G08G 1/0965; G08G 1/096716; G08G 1/096725; B60R 16/0236; G05D 1/0246
See application file for complete search history.

(56) References Cited

U.S. PATENT DOCUMENTS 4,764,978 A * 8/1988 Argo .................... G08G 1/0965
340/902
5,510,990 A * 4/1996 Hibino ............... B60K 31/0008
701/96

(Continued)

*Primary Examiner* — Hoi C Lau
(74) *Attorney, Agent, or Firm* — Husch Blackwell LLP

(57) ABSTRACT

A method for detecting emergency vehicles in real time, and managing subject vehicles to support the emergency vehicles to drive without interferences from the subject vehicles by referring to detected information on the emergency vehicles is provided. And the method includes steps of: (a) a management server generating metadata on the specific emergency vehicle by referring to emergency circumstance information; (b) the management server generating a circumstance scenario vector by referring to the emergency circumstance information and the metadata, comparing the circumstance scenario vector with reference scenario vectors, to thereby find a specific scenario vector whose similarity score with the circumstance scenario vector is larger than a threshold, and acquiring an emergency reaction command by referring to the specific scenario (Continued)

vector; (c) the management server transmitting the emergency reaction command to each of the subject vehicles.

20 Claims, 4 Drawing Sheets

(51) Int. Cl.
  *G01C 21/36* (2006.01)
  *G05D 1/02* (2020.01)

(56) References Cited

U.S. PATENT DOCUMENTS

| | | | |
|---|---|---|---|
| 6,690,291 B1 * | 2/2004 | Cardillo | G08G 1/096716 340/901 |
| 9,547,986 B1 * | 1/2017 | Curlander | G08G 1/04 |
| 9,766,628 B1 * | 9/2017 | Lo | G05D 1/0246 |
| 10,210,756 B2 * | 2/2019 | Arunachalam | G08G 1/0965 |
| 10,319,228 B2 * | 6/2019 | Silver | G06F 16/683 |
| 10,565,873 B1 * | 2/2020 | Christensen | H04W 4/029 |
| 2006/0227008 A1 * | 10/2006 | Bryant | G08G 1/0965 340/902 |
| 2007/0159354 A1 * | 7/2007 | Rosenberg | G08G 1/0965 340/902 |
| 2016/0231746 A1 * | 8/2016 | Hazelton | B60W 30/00 |
| 2016/0284212 A1 * | 9/2016 | Tatourian | G08G 1/096725 |
| 2016/0355125 A1 * | 12/2016 | Herbert | B60K 35/00 |
| 2017/0076598 A1 * | 3/2017 | Scofield | H04M 15/60 |
| 2017/0086230 A1 * | 3/2017 | Azevedo | H04W 4/38 |
| 2017/0249839 A1 * | 8/2017 | Becker | H04W 4/90 |
| 2017/0263120 A1 * | 9/2017 | Durie, Jr. | G06K 9/00832 |
| 2017/0291543 A1 * | 10/2017 | Goldman-Shenhar | G08G 1/166 |
| 2018/0194280 A1 * | 7/2018 | Shibata | G01C 21/3658 |
| 2019/0027032 A1 * | 1/2019 | Arunachalam | G08G 1/0965 |
| 2019/0113926 A1 * | 4/2019 | Sim | H04W 4/40 |
| 2019/0138003 A1 * | 5/2019 | Ming | B60W 50/14 |
| 2019/0279005 A1 * | 9/2019 | Ogale | B60R 1/00 |
| 2019/0333381 A1 * | 10/2019 | Shalev-Shwartz | B60W 30/09 |
| 2020/0094826 A1 * | 3/2020 | Abe | B60W 30/143 |

* cited by examiner

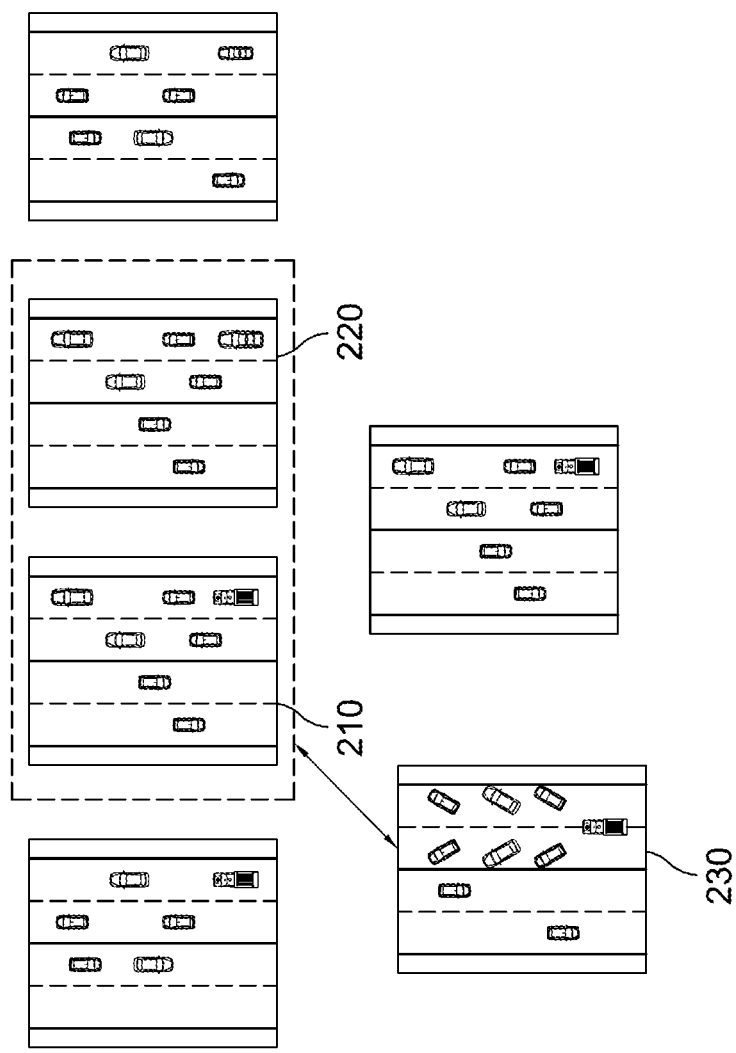

METHOD AND DEVICE FOR DETECTING EMERGENCY VEHICLES IN REAL TIME AND PLANNING DRIVING ROUTES TO COPE WITH SITUATIONS TO BE EXPECTED TO BE OCCURRED BY THE EMERGENCY VEHICLES

CROSS REFERENCE OF RELATED APPLICATION

This present application claims the benefit of the earlier filing date of provisional patent application No. 62/799,532, filed Jan. 31, 2019, the entire contents of which being incorporated herein by reference.

FIELD OF THE DISCLOSURE

The present disclosure relates to a method for detecting emergency vehicles in real time and planning driving routes to cope with situations to be expected to be occurred by the emergency vehicles, and a device using the same.

BACKGROUND OF THE DISCLOSURE

An autonomous vehicle is a vehicle that is capable of sensing its environment and navigating with little or no user input. The autonomous vehicle senses its environment using sensing devices such as radar, LiDAR, image sensors, and the like. An autonomous vehicle system of the autonomous vehicle further uses information from global positioning systems (GPS) technology, navigation systems, vehicle-to-vehicle communication, vehicle-to-infrastructure technology, and/or drive-by-wire systems to navigate the autonomous vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

In order to fully automate a vehicle, the vehicle must be aware of common signs and signals in the environment and respond thereto. For example, emergency vehicles generate warning sounds and/or visual signals to notify vehicles on the road to pull over.

Accordingly, the inventors of the present disclosure propose a method for planning a driving route in an emergency traffic situation.

SUMMARY OF THE DISCLOSURE

It is an object of the present disclosure to solve all the aforementioned problems.

It is another object of the present disclosure to plan driving routes of vehicles in an emergency traffic situation.

It is still another object of the present disclosure to plan the driving routes of the vehicles in the emergency traffic situation by detecting an emergency vehicle, tracking and sharing a location of the emergency vehicle.

It is still yet another object of the present disclosure to allow the emergency vehicle and its nearby vehicles to respond in real-time to the emergency traffic situation.

In accordance with one aspect of the present disclosure, there is provided a method for detecting one or more emergency vehicles in real time, and managing one or more subject vehicles to support the emergency vehicles to drive without interferences from the subject vehicles by referring to detected information on the emergency vehicles, including steps of: (a) a management server, if emergency circumstance information on at least one specific emergency vehicle, among the emergency vehicles, is acquired through at least part of one or more sensors in at least part of one or more connected vehicles, including the subject vehicles, interworking therewith, generating metadata on the specific emergency vehicle by referring to the emergency circumstance information; (b) the management server (i) generating at least one circumstance scenario vector by referring to the emergency circumstance information and the metadata, (ii) comparing the circumstance scenario vector with one or more reference scenario vectors in a scenario database (the term "database" also being referred to as "DB" hereinafter), to thereby find at least one specific scenario vector whose similarity score with the circumstance scenario vector is larger than a first threshold, and (iii) acquiring an emergency reaction command by referring to the specific scenario vector; and (c) the management server transmitting the emergency reaction command to each of the subject vehicles whose relationship with the specific emergency vehicle satisfies a specific condition, to thereby support the specific emergency vehicle and the subject vehicles to drive while controlling their interference scores for each other to be smaller than a second threshold.

As one example, at the step of (a), the management server selects one or more reference vehicles, to be used for generating at least part of the metadata, among the connected vehicles, whose relationship with the specific emergency vehicle satisfies at least one of a direct interaction condition and an indirect interaction condition, and estimates at least one location of the specific emergency vehicle by referring to relative coordinates representing relative locations among the reference vehicles and the specific emergency vehicle, to thereby generate said at least part of the metadata.

As one example, at the step of (c), the management server selects the subject vehicles, among the connected vehicles, whose distances from the specific emergency vehicle are smaller than a third threshold so that the specific condition is satisfied, by referring to the estimated location of the specific emergency vehicle.

As one example, at the step of (a), (i) one or more first reference vehicles, among the reference vehicles, which satisfy the direct interaction condition, estimate relative locations of the specific emergency vehicle therefrom by using at least part of their one or more image sensors, one or more radar sensors and one or more Lidar sensors, to thereby generate one or more specific emergency vehicle relative coordinates among the relative coordinates, (ii) one or more second reference vehicles, among the reference vehicles, which satisfy the indirect interaction condition, estimate relative locations of the first reference vehicles therefrom by using at least part of their one or more image sensors, one or more radar sensors and one or more Lidar sensors, to thereby generate one or more first reference vehicle relative coordinates among the relative coordinates, and (iii) the first and the second reference vehicles transmit the relative coordinates to the management server.

As one example, the management server performs a process of (i) generating one or more first specific emergency vehicle absolute coordinates based on the first reference vehicles by referring to absolute coordinates of the first reference vehicles and their corresponding specific emergency vehicle relative coordinates, (ii) generating one or more second specific emergency vehicle absolute coordinates based on the second reference vehicles by referring to absolute coordinates of the second reference vehicles, their corresponding first reference vehicle relative coordinates and their corresponding specific emergency vehicle relative coordinates, and (iii) estimating said location of the specific emergency vehicle by referring to at least part of the first specific emergency vehicle absolute coordinates and the second specific emergency vehicle absolute coordinates.

As one example, at the step of (a), the management server transmits an alarm to at least part of specific connected vehicles and specific connected pedestrians located closer than a fourth threshold from the specific emergency vehicle.

As one example, at the step of (a), at least part of the emergency circumstance information is generated by neural networks processing a specific image including the specific emergency vehicle, wherein, on condition that (i) a first neural network, among the neural networks, has applied at least one first Convolutional Neural Network (CNN) operation to the specific image in order to determine whether the specific image has a global visional feature corresponding to the specific emergency vehicle or not, to thereby generate first decision information, (ii) a second neural network, among the neural networks, has applied at least one second CNN operation to a prescribed specific region of the specific image in order to determine whether the specific image has a local visional feature corresponding thereto or not, to thereby generate second decision information, and (iii) a third neural network, among the neural networks, has applied at least one third CNN operation to the prescribed specific region thereof in order to determine whether the specific image has a local temporal feature corresponding thereto or not, to thereby generate third decision information, said part of the emergency circumstance information is generated by referring to the first to the third decision information.

As one example, at the step of (b), the management server (i) maps location information of the specific emergency vehicle and the subject vehicles onto a virtual plane by referring to the metadata, to thereby generate the circumstance scenario vector, (ii) calculates similarity scores between the circumstance scenario vector and each of the reference scenario vectors, to thereby select one or more candidate scenario vectors, and (iii) select the specific scenario vector among the candidate scenario vectors by referring to the emergency circumstance information.

As one example, at the step of (c), the subject vehicles (i) calculate the interference scores in relation to the specific emergency vehicle by referring to at least part of (i-1) a combination of distance information between the specific emergency vehicle and each of the subject vehicles and differential information on the distance information, and (i-2) gap information between the emergency reaction command and each of actual driving actions of the specific emergency vehicle, and (ii) transmit the interference scores to the management server.

As one example, the method further includes a step of: (d) the management server, if a time of at least part of the interference scores being maintained as larger than the second threshold is larger than a fifth threshold, (i) generating another metadata of the specific emergency vehicle at that timing, (ii) generating another emergency reaction command for that timing by referring to said another metadata, and (iii) transmitting said another emergency reaction command for another subject vehicles for that timing, wherein said another metadata, said another emergency reaction command and said another subject vehicles in the step of (d) correspond to the timing later than that of the steps of (a) to (c).

In accordance with another aspect of the present disclosure, there is provided a management server for detecting one or more emergency vehicles in real time, and managing one or more subject vehicles to support the emergency vehicles to drive without interferences from the subject vehicles by referring to detected information on the emergency vehicles, including: at least one memory that stores instructions; and at least one processor configured to execute the instructions to perform processes of: (I) if emergency circumstance information on at least one specific emergency vehicle among the emergency vehicles is acquired through at least part of one or more sensors in at least part of one or more connected vehicles, including the subject vehicles, interworking therewith, generating metadata on the specific emergency vehicle by referring to the emergency circumstance information; (II) (i) generating at least one circumstance scenario vector by referring to the emergency circumstance information and the metadata, (ii) comparing the circumstance scenario vector with one or more reference scenario vectors in a scenario DB, to thereby find at least one specific scenario vector whose similarity score with the circumstance scenario vector is larger than a first threshold, and (iii) acquiring an emergency reaction command by referring to the specific scenario vector; and (III) transmitting the emergency reaction command to each of the subject vehicles whose relationship with the specific emergency vehicle satisfies a specific condition, to thereby support the specific emergency vehicle and the subject vehicles to drive while controlling their interference scores for each other to be smaller than a second threshold.

As one example, at the process of (I), the processor selects one or more reference vehicles, to be used for generating at least part of the metadata, among the connected vehicles, whose relationship with the specific emergency vehicle satisfies at least one of a direct interaction condition and an indirect interaction condition, and estimates at least one location of the specific emergency vehicle by referring to relative coordinates representing relative locations among the reference vehicles and the specific emergency vehicle, to thereby generate said at least part of the metadata.

As one example, at the process of (III), the processor selects the subject vehicles, among the connected vehicles, whose distances from the specific emergency vehicle are smaller than a third threshold so that the specific condition is satisfied, by referring to the estimated location of the specific emergency vehicle.

As one example, at the process of (I), (i) one or more first reference vehicles, among the reference vehicles, which satisfy the direct interaction condition, estimate relative locations of the specific emergency vehicle therefrom by using at least part of their one or more image sensors, one or more radar sensors and one or more Lidar sensors, to thereby generate one or more specific emergency vehicle relative coordinates among the relative coordinates, (ii) one or more second reference vehicles, among the reference vehicles, which satisfy the indirect interaction condition, estimate relative locations of the first reference vehicles therefrom by using at least part of their one or more image sensors, one or more radar sensors and one or more Lidar sensors, to thereby generate one or more first reference vehicle relative coordinates among the relative coordinates, and (iii) the first and the second reference vehicles transmit the relative coordinates to the management server.

As one example, the processor performs a process of (i) generating one or more first specific emergency vehicle absolute coordinates based on the first reference vehicles by referring to absolute coordinates of the first reference vehicles and their corresponding specific emergency vehicle relative coordinates, (ii) generating one or more second specific emergency vehicle absolute coordinates based on the second reference vehicles by referring to absolute coordinates of the second reference vehicles, their corresponding first reference vehicle relative coordinates and their corresponding specific emergency vehicle relative coordinates, and (iii) estimating said location of the specific emergency vehicle by referring to at least part of the first specific emergency vehicle absolute coordinates and the second specific emergency vehicle absolute coordinates.

As one example, at the process of (I), the processor transmits an alarm to at least part of specific connected vehicles and specific connected pedestrians located closer than a fourth threshold from the specific emergency vehicle.

As one example, at the process of (I), at least part of the emergency circumstance information is generated by neural networks processing a specific image including the specific emergency vehicle, wherein, on condition that (i) a first neural network, among the neural networks, has applied at least one first Convolutional Neural Network (CNN) operation to the specific image in order to determine whether the specific image has a global visional feature corresponding to the specific emergency vehicle or not, to thereby generate first decision information, (ii) a second neural network, among the neural networks, has applied at least one second CNN operation to a prescribed specific region of the specific image in order to determine whether the specific image has a local visional feature corresponding thereto or not, to thereby generate second decision information, and (iii) a third neural network, among the neural networks, has applied at least one third CNN operation to the prescribed specific region thereof in order to determine whether the specific image has a local temporal feature corresponding thereto or not, to thereby generate third decision information, said part of the emergency circumstance information is generated by referring to the first to the third decision information.

As one example, at the process of (II), the processor (i) maps location information of the specific emergency vehicle and the subject vehicles onto a virtual plane by referring to the metadata, to thereby generate the circumstance scenario vector, (ii) calculates similarity scores between the circumstance scenario vector and each of the reference scenario vectors, to thereby select one or more candidate scenario vectors, and (iii) select the specific scenario vector among the candidate scenario vectors by referring to the emergency circumstance information.

As one example, at the process of (III), the subject vehicles (i) calculate the interference scores in relation to the specific emergency vehicle by referring to at least part of (i-1) a combination of distance information between the specific emergency vehicle and each of the subject vehicles and differential information on the distance information, and (i-2) gap information between the emergency reaction command and each of actual driving actions of the specific emergency vehicle, and (ii) transmit the interference scores to the management server.

As one example, the processor further performs a process of: (IV) if a time of at least part of the interference scores being maintained as larger than the second threshold is larger than a fifth threshold, (i) generating another metadata of the specific emergency vehicle at that timing, (ii) generating another emergency reaction command for that timing by referring to said another metadata, and (iii) transmitting said another emergency reaction command for another subject vehicles for that timing, wherein said another metadata, said another emergency reaction command and said another subject vehicles in the step of (d) correspond to the timing later than that of the steps of (a) to (c).

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

FIG. 4 is a drawing schematically illustrating a process of generating an emergency reaction command by using a circumstance scenario vector to be used for performing the method for detecting the specific emergency vehicle in real time, and managing the subject vehicles to support the emergency vehicles to drive without the interferences from the subject vehicles by using the detected information on the emergency vehicles in accordance with one example embodiment of the present disclosure.

DETAILED DESCRIPTION OF THE PREFERRED EMBODIMENTS

Figure 1:
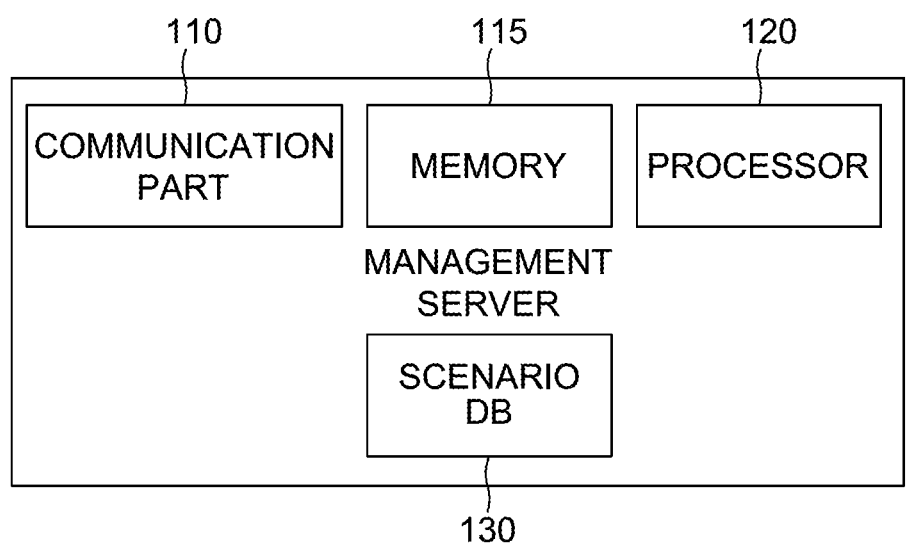
FIG. 1 is a drawing schematically illustrating a management server to be used for performing a method for detecting emergency vehicles in real time, and managing subject vehicles to support the emergency vehicles to drive without interferences from the subject vehicles by using detected information on the emergency vehicles in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

FIG. 1 is a drawing schematically illustrating a management server to be used for performing a method for detecting emergency vehicles in real time, and managing subject vehicles to support the emergency vehicles to drive without interferences from the subject vehicles by using detected information on the emergency vehicles in accordance with one example embodiment of the present disclosure.

By referring to FIG. 1, the management server 100 may include a scenario DB 130 to be described later. Processes of input/output and computations of the scenario DB 130 may be respectively performed by at least one communication part 110 and at least one processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the computing device 100 does not exclude an integrated device including any combination of a processor, a memory, a medium, or any other computing components.

Such management server 100 may interwork with multiple connected vehicles. Herein, said multiple vehicles may perform an autonomous driving with a support of the management server 100. As one example, the multiple vehicles may perform a platoon driving. Said connected vehicles may include sensors to be used for performing the autonomous driving. As one example, the connected vehicles may include at least part of image sensors, i.e., cameras, radar sensors and Lidar sensors. Further, the connected vehicles may include sound sensors. To be explained later, the image sensors and the sound sensors may be used for detecting the emergency vehicles.

Hereinafter, the method for detecting the emergency vehicles and managing subject vehicles to support the emergency vehicle will be explained by referring to FIG. 2.

Figure 2:
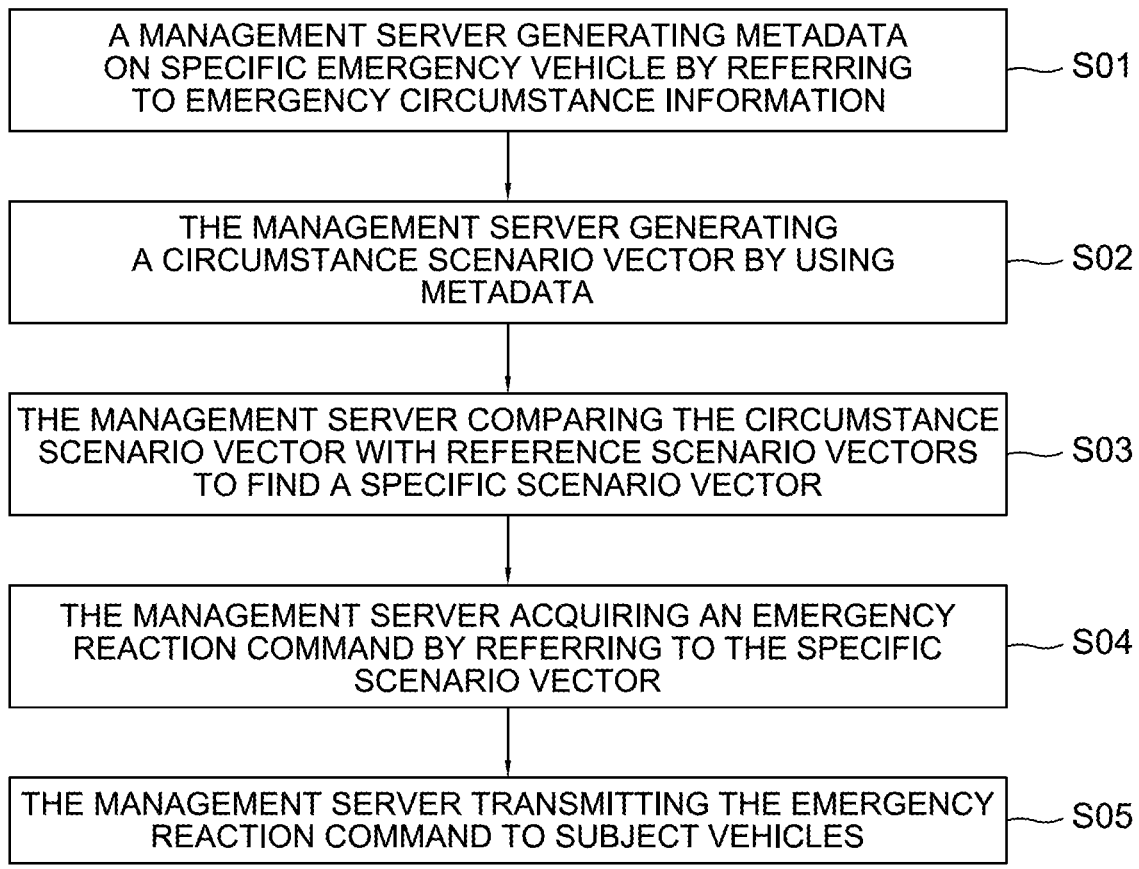
FIG. 2 is a drawing schematically illustrating the method for detecting the emergency vehicles in real time, and managing the subject vehicles to support the emergency vehicles to drive without the interferences from the subject vehicles by using the detected information on the emergency vehicles in accordance with one example embodiment of the present disclosure.

FIG. 2 is a drawing schematically illustrating the method for detecting the emergency vehicles in real time, and managing the subject vehicles to support the emergency vehicles to drive without the interferences from the subject vehicles by using the detected information on the emergency vehicles in accordance with one example embodiment of the present disclosure.

By referring to FIG. 2, at a step of SOL the management server 100, if emergency circumstance information on at least one specific emergency vehicle, among the emergency vehicles, is acquired through at least part of one or more sensors in at least part of one or more connected vehicles including the subject vehicles interworking therewith, may generate metadata on the specific emergency vehicle by referring to the emergency circumstance information. Then, at a step of S02, the management server 100 may generate at least one circumstance scenario vector by referring to the emergency circumstance information and the metadata. Also, at a step of S03, the management server 100 may compare the circumstance scenario vector with one or more reference scenario vectors in the scenario DB 130, to thereby find at least one specific scenario vector whose similarity score with the circumstance scenario vector is larger than a first threshold. Thereafter, at a step of S04, the management server 100 may acquire an emergency reaction command by referring to the specific scenario vector. Finally, at a step of S05, the management server 100 may transmit the emergency reaction command to each of the subject vehicles whose relationship with the specific emergency vehicle satisfies a specific condition, to thereby support the specific emergency vehicle and the subject vehicles to drive while controlling their interference scores for each other to be smaller than a second threshold.

Each of the steps shown above will be explained below specifically.

First, the management server 100, while having communications with the connected vehicles to manage the autonomous driving of the connected vehicles, may acquire one or more signals from at least part of the subject vehicles that said at least part of the subject vehicles have detected the specific emergency vehicle. As one example for an image sensor-based embodiment, neural networks on each of the connected vehicles may process each of specific images photographed by each of its corresponding image sensors to determine whether each of the specific images includes the specific emergency vehicle or not. As another example for other sensor-based embodiment, said sound sensors or microphones in smartphones of passengers in the connected vehicles may analyze its inputted sounds to determine whether the specific emergency vehicle is ringing a siren around them or not. As still another example, in case the specific emergency vehicle just interworks with the management server 100, the specific emergency vehicle may transmit its emergency and its location thereto, so that the management server 100 may acknowledge the emergency of the specific emergency vehicle. A person in the art may combine such examples to detect the specific emergency vehicle. For example, all three examples may be used in parallel to detect the specific emergency vehicle, or part of those may be used for detecting the specific emergency vehicle.

Herein, the example for the image sensor-based embodiment will be explained more specifically.

That is, each of the connected vehicles may include some neural networks, e.g., a first to a third neural networks. Herein, the first and the second neural network may be built as a conventional Convolutional Neural Network (CNN). Accordingly, the first and the second neural network may include at least one convolutional layer, at least one pooling layer and at least one Fully-Connected (FC) layer. The third neural network may be built as a common Recurrent Neural Network (RNN), or, more specifically, as a Long-Short Term Memory (LSTM) network, which is one kind of the RNN. Accordingly, the third neural network may include a status vector which is used for processing its inputted image. Herein, the status vector may be updated while said inputted image is processed.

In such basis, if one of the specific images is inputted, it may be delivered to the first to the third neural networks in parallel. To begin with, the first neural network may process a whole part of said one of the specific images. Specifically, the first neural network may apply at least one first CNN operation to said one of the specific images in order to determine whether said one of the specific images has a global visional feature corresponding to the specific emergency vehicle or not, to thereby generate first decision information. Comparing to this, the second and the third neural networks may process a prescribed specific region in said one of the specific images, not the whole part like the first neural network. As one example, the specific region may be one of upper regions in the specific images where emergency lights of ambulance or police cars are expected to be located. Accordingly, the second neural network may apply at least one second CNN operation to the specific region of said one of the specific images in order to determine whether said one of the specific images has a local visional feature corresponding thereto or not, to thereby generate second decision information. Also, the third neural network may apply at least one RNN operation to the specific region thereof in order to determine whether said one of the specific images has a local temporal feature corresponding thereto or not. Said first to said third decision information may be outputted as probability values.

After the first to the third decision information are generated, at least part of the emergency circumstance information may be generated by referring to the first to the third decision information. As one example, a weighted average of the first to the third decision information may be used for determining whether said one of the specific images corresponds to the specific emergency vehicle or not.

After the specific emergency vehicle is identified by a specific connected vehicle, the specific connected vehicle may transmit the emergency circumstance information including information on an existence of the specific emergency vehicle, features thereof and classes thereof, to the management server 100. The emergency circumstance information may additionally include initial location information of the specific emergency vehicle. The initial location information may be acquired through different ways according to embodiments. As one example, if the specific emergency vehicle is connected with the management server 100, it may be acquired through a Global Positional System (GPS) in the specific emergency vehicle. Otherwise, the specific connected vehicle may calculate a relative location of the specific emergency vehicle by performing an image-based operation, and estimate an absolute location thereof by using the relative location and location information of itself acquired through its GPS. Then, the management server 100 may generate the metadata including information on more accurate location of the specific emergency vehicle. Hereinafter, it will be explained more specifically.

That is, the management server 100 may select one or more reference vehicles, to be used for generating at least part of the metadata, among the connected vehicles, whose relationships with the specific emergency vehicle satisfy at least one of a direct interaction condition and an indirect interaction condition. Herein, the direct interaction condition may be a condition on whether one of the connected vehicles is capable of photographing the specific emergency vehicle directly with its own image sensors or not. On the other hand, the indirect interaction condition may be a condition on whether one of the connected vehicles is capable of photographing some of the connected vehicles which are capable of photographing the specific emergency vehicle with its own image sensors or not. For example, if said some of the reference vehicles satisfying the direct interaction condition are called first reference vehicles, another some of the reference vehicles capable of photographing the first reference vehicles may satisfy the indirect interaction condition, and thus be called as second reference vehicles. Whether each of the connected vehicles satisfies any one of the direct and the indirect condition or not may be determined by using the initial location information of the specific emergency vehicle and directions of the image sensors in some of the connected vehicles located around the specific emergency vehicle. In order to take a look at an example of such process, FIG. 3 will be referred to.

Figure 3:
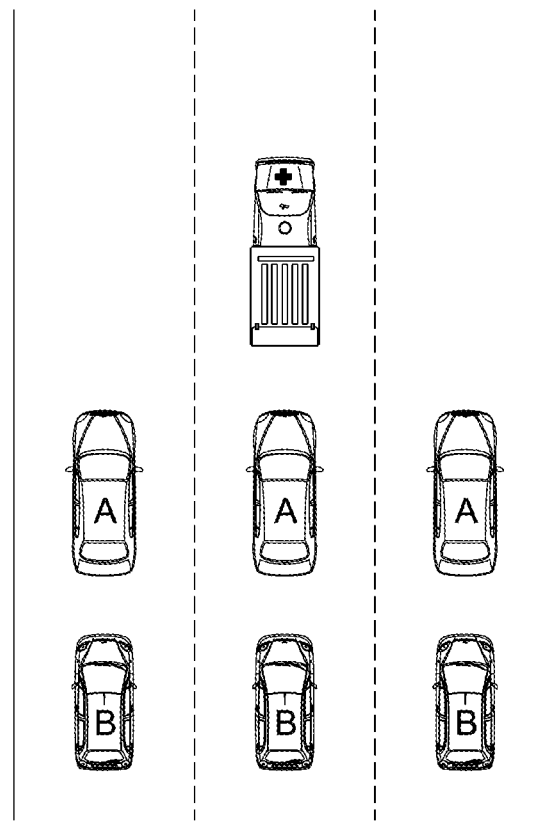
FIG. 3 is a drawing schematically illustrating an example of selected reference vehicles to be used for performing the method for detecting a specific emergency vehicle in real time, and managing the subject vehicles to support the emergency vehicles to drive without the interferences from the subject vehicles by using the detected information on the emergency vehicles in accordance with one example embodiment of the present disclosure.

FIG. 3 is a drawing schematically illustrating an example of selected reference vehicles to be used for performing the method for detecting the specific emergency vehicle in real time, and managing the subject vehicles to support the emergency vehicles to drive without the interferences from the subject vehicles by using the detected information on the emergency vehicles in accordance with one example embodiment of the present disclosure.

By referring to FIG. 3, if directions of the image sensors on the connected vehicles are towards the front thereof, vehicles noted as A, located at right back of the specific emergency vehicle are selected as the first reference vehicles, and other vehicles noted as B, located at the back of the first reference vehicles are selected as the second reference vehicles.

Thereafter, each of the reference vehicles may transmit each of relative coordinates representing each of relative locations between each of the reference vehicles and the specific emergency vehicle or among the reference vehicles.

Specifically, the first reference vehicles may estimate relative locations of the specific emergency vehicle therefrom by using at least part of their image sensors, radar sensors and Lidar sensors, to thereby generate one or more specific emergency vehicle relative coordinates among the relative coordinates. If the image sensors are used, lateral and longitudinal distances between the specific emergency vehicle and each of the first reference vehicles may be calculated by using well-known image processing technologies. If the radar sensors or the Lidar sensors are used, the management server 100 may match objects detected by said radar and the Lidar sensors with objects on its prescribed vehicle location map, i.e., a bird-view map, to find said lateral and the longitudinal distances. Also, the second reference vehicles may estimate relative locations of the first reference vehicles therefrom by using at least part of their image sensors, radar sensors and Lidar sensors, to thereby generate one or more first reference vehicle relative coordinates among the relative coordinates. Specific process of acquiring the first reference vehicle relative coordinates may be similar to that of acquiring the specific emergency vehicle relative coordinates.

Thereafter, the management server 100 may generate one or more first specific emergency vehicle absolute coordinates based on the first reference vehicles by referring to absolute coordinates of the first reference vehicles and their corresponding specific emergency vehicle relative coordinates. Also, the management server 100 may generate one or more second specific emergency vehicle absolute coordinates based on the second reference vehicles by referring to absolute coordinates of the second reference vehicles, their corresponding first reference vehicle relative coordinates and their corresponding specific emergency vehicle relative coordinates.

Herein, since the first specific emergency vehicle absolute coordinates are calculated by adding the specific emergency vehicle relative coordinates, i.e., distances calculated by using the image sensors, the radar sensors or the Lidar sensors, to their corresponding absolute coordinates of the first reference vehicles acquired from their own GPSs, those may be more accurate than the initial location information of the specific emergency vehicle on which an error of the GPS in the specific emergency vehicle may have been reflected. Similarly, since the second specific emergency vehicle absolute coordinates may be calculated by adding the first reference vehicle relative coordinates to absolute coordinates of the second reference vehicles to generate specific sums, and then adding their corresponding specific emergency vehicle relative coordinates to their corresponding specific sums, those may be more accurate than the initial location information thereof.

Accordingly, the management server 100 may estimate at least one final location of the specific emergency vehicle which is more accurate than the initial location by referring to at least part of the first and the second specific emergency vehicle absolute coordinates, to thereby generate said at least part of the metadata. As one example, a weighted sum of the first and the second specific emergency vehicle absolute coordinates may be used for generating said at least part of the metadata.

In the above explanation, it was assumed that the second reference vehicles are vehicles capable of photographing the first reference vehicles. However, there is another embodiment of assuming the second reference vehicles as vehicles photographed by the first reference vehicles. In this case, the second specific emergency vehicle absolute coordinates may be calculated by subtracting (s1) relative coordinates of the second reference vehicles from the first reference vehicles from (s2) the absolute coordinates of the second reference vehicles, and then by adding the specific emergency vehicle relative coordinates. Of course, a combination of the two embodiments may be possible.

Thereafter, the management server 100 may select the subject vehicles, among the connected vehicles, which satisfy the specific condition, by referring to the metadata including information on the estimated location of the specific emergency vehicle. Herein, distances between each of the subject vehicles which satisfy the specific condition and the specific emergency vehicle may be smaller than a third threshold. Then, the management server 100 may map location information of the specific emergency vehicle and the subject vehicles onto a virtual plane by referring to the metadata, to thereby generate the circumstance scenario vector. That is, the circumstance scenario vector including information on how the specific emergency vehicle and the subject vehicles are arranged. Thereafter, the management server 100 may compare arrangements of components in the reference scenario vectors acquired from the scenario DB 130 and the circumstance scenario vector to calculate similarity scores between the circumstance scenario vector and each of the reference scenario vectors, to thereby select one or more candidate scenario vectors. Herein, the candidate scenario vectors may be some of the scenario vectors whose similarity scores are the largest N ones. Then, the management server 100 may select a specific scenario vector among the candidate scenario vectors by referring to the information on the classes and the features of the specific emergency vehicle included in the emergency circumstance information. Thereafter, the management server 100 may acquire the emergency reaction command corresponding to the specific scenario vector from the scenario DB 130, and transmit the emergency reaction command to the subject vehicles, to thereby support the specific emergency vehicle and the subject vehicles to drive while controlling their interference scores for each other to be smaller than a second threshold. In order to take a look at an example of such process, FIG. 4 will be referred to.

FIG. 4 is a drawing schematically illustrating a process of generating an emergency reaction command by using a circumstance scenario vector to be used for performing the method for detecting the specific emergency vehicle in real time, and managing the subject vehicles to support the emergency vehicles to drive without the interferences from the subject vehicles by using the detected information on the emergency vehicles in accordance with one example embodiment of the present disclosure.

By referring to FIG. 4, it can be seen that the candidate scenario vectors 210 and 220 which are more similar to the circumstance scenario vector are selected among the reference scenario vectors. Also, it can be seen that, among each of the candidate scenario vectors 210 and 220 corresponding to each of an ambulance and a police car, one of the candidate scenario vectors 210 which is more similar to the circumstance scenario vector corresponding to the ambulance is selected. In this case, the ambulance should pass its corresponding section quickly, thus the emergency reaction command 230 may be a command for the subject vehicles to move to sides of a road. What is illustrated in FIG. 4 is just an example. That is, further, by according to where the specific emergency vehicle is located, e.g., a left, a right, or a center of the road, the emergency reaction command may correspond to a dodging movement to the right, the left or the sides of the road.

By performing the above processes, the specific emergency vehicle and the subject vehicles may become capable of driving while controlling their interference scores for each other to be smaller than the second threshold. However, during an actual driving, there may be a problem. Thus, a feedback process for preventing such problem will be explained below.

That is, the management server 100 may continuously receive the interference scores from the subject vehicles after transmitting the emergency reaction command. Herein, the interference scores between the specific emergency vehicle and each of the subject vehicles may be calculated by referring to at least part of (i) a combination of distance information between the specific emergency vehicle and each of the subject vehicles and differential information on the distance information, and (ii) gap information between the emergency reaction command and each of actual driving actions of the specific emergency vehicle. The differential information may denote changes of the distances therebetween. Such combination can be used for generating the interference scores because a drastic change of the distances when the distances are smaller than a sixth threshold may represent an interfering situation between the subject emergency vehicle and each of at least part of the subject vehicles. Also, the gap information between the emergency reaction command and each of actual driving actions of the specific emergency vehicle can be used because the gap may become larger when the specific emergency vehicle and some of the subject vehicles which drive according to the emergency reaction command interfere with each other so that a danger of an accident becomes larger.

On this basis, if a time of at least part of the interference scores being maintained as larger than the second threshold is larger than a fifth threshold, the management server 100 may cancel its previously transmitted emergency reaction command, generate another metadata of the specific emergency vehicle at that timing and another emergency reaction command for that timing by referring to said another metadata, and transmit said another emergency reaction command for another subject vehicles for that timing. Herein, said another metadata, said another emergency reaction command and said another subject vehicles correspond to said timing later than that of the steps of S01 to S05. In this way, the specific emergency vehicle becomes capable of moving properly without the danger of the accident.

In parallel with the above processes, the management server 100 may transmit an alarm to at least part of specific connected vehicles and specific connected pedestrians located closer than a fourth threshold from the specific emergency vehicle. For the specific connected vehicles, the alarm may be given through head-up displays thereof. Otherwise, for the specific connected pedestrians, the alarm may be given through smartphones thereof.

The present disclosure has an effect of planning the driving paths of the vehicles in the emergency traffic situation.

The present disclosure has another effect of allowing the nearby vehicles and the emergency vehicle to respond in real-time by planning the driving paths of the vehicles in the emergency traffic situation via detecting the emergency vehicle, tracking and sharing the location of the emergency vehicle.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for detecting one or more emergency vehicles in real time, and managing one or more subject vehicles to support the emergency vehicles to drive without interferences from the subject vehicles by referring to detected information on the emergency vehicles, comprising steps of:
   (a) a management server, if emergency circumstance information on at least one specific emergency vehicle among the emergency vehicles is acquired through at least part of one or more sensors in at least part of one or more connected vehicles, including the subject vehicles, interworking therewith, generating metadata on the specific emergency vehicle by referring to the emergency circumstance information;
   (b) the management server (i) generating at least one circumstance scenario vector by referring to the emergency circumstance information and the metadata, (ii) comparing the circumstance scenario vector with one or more reference scenario vectors in a scenario database ("DB"), to thereby find at least one specific scenario vector whose similarity score with the circumstance scenario vector is larger than a first threshold, and (iii) acquiring an emergency reaction command by referring to the specific scenario vector; and
   (c) the management server transmitting the emergency reaction command to each of the subject vehicles whose relationship with the specific emergency vehicle satisfies a specific condition, to thereby support the specific emergency vehicle and the subject vehicles to drive while controlling their interference scores for each other to be smaller than a second threshold.

2. The method of claim 1, wherein, at the step of (a), the management server selects one or more reference vehicles, to be used for generating at least part of the metadata, among the connected vehicles, whose relationship with the specific emergency vehicle satisfies at least one of a direct interaction condition and an indirect interaction condition, and estimates at least one location of the specific emergency vehicle by referring to relative coordinates representing relative locations among the reference vehicles and the specific emergency vehicle, to thereby generate said at least part of the metadata.

3. The method of claim 2, wherein, at the step of (c), the management server selects the subject vehicles, among the connected vehicles, whose distances from the specific emergency vehicle are smaller than a third threshold so that the specific condition is satisfied, by referring to the estimated location of the specific emergency vehicle.

4. The method of claim 2, wherein, at the step of (a), (i) one or more first reference vehicles, among the reference vehicles, which satisfy the direct interaction condition, estimate relative locations of the specific emergency vehicle therefrom by using at least part of their one or more image sensors, one or more radar sensors and one or more Lidar sensors, to thereby generate one or more specific emergency vehicle relative coordinates among the relative coordinates, (ii) one or more second reference vehicles, among the reference vehicles, which satisfy the indirect interaction condition, estimate relative locations of the first reference vehicles therefrom by using at least part of their one or more image sensors, one or more radar sensors and one or more Lidar sensors, to thereby generate one or more first reference vehicle relative coordinates among the relative coordinates, and (iii) the first and the second reference vehicles transmit the relative coordinates to the management server.

5. The method of claim 4, wherein the management server performs a process of (i) generating one or more first specific emergency vehicle absolute coordinates based on the first reference vehicles by referring to absolute coordinates of the first reference vehicles and their corresponding specific emergency vehicle relative coordinates, (ii) generating one or more second specific emergency vehicle absolute coordinates based on the second reference vehicles by referring to absolute coordinates of the second reference vehicles, their corresponding first reference vehicle relative coordinates and their corresponding specific emergency vehicle relative coordinates, and (iii) estimating said location of the specific emergency vehicle by referring to at least part of the first specific emergency vehicle absolute coordinates and the second specific emergency vehicle absolute coordinates.

6. The method of claim 1, wherein, at the step of (a), the management server transmits an alarm to at least part of specific connected vehicles and specific connected pedestrians located closer than a fourth threshold from the specific emergency vehicle.

7. The method of claim 1, wherein, at the step of (a), at least part of the emergency circumstance information is generated by neural networks processing a specific image including the specific emergency vehicle,
wherein, on condition that (i) a first neural network, among the neural networks, has applied at least one first Convolutional Neural Network (CNN) operation to the specific image in order to determine whether the specific image has a global visional feature corresponding to the specific emergency vehicle or not, to thereby generate first decision information, (ii) a second neural network, among the neural networks, has applied at least one second CNN operation to a prescribed specific region of the specific image in order to determine whether the specific image has a local visional feature corresponding thereto or not, to thereby generate second decision information, and (iii) a third neural network, among the neural networks, has applied at least one third CNN operation to the prescribed specific region thereof in order to determine whether the specific image has a local temporal feature corresponding thereto or not, to thereby generate third decision information, said part of the emergency circumstance information is generated by referring to the first to the third decision information.

8. The method of claim 1, wherein, at the step of (b), the management server (i) maps location information of the specific emergency vehicle and the subject vehicles onto a virtual plane by referring to the metadata, to thereby generate the circumstance scenario vector, (ii) calculates similarity scores between the circumstance scenario vector and each of the reference scenario vectors, to thereby select one or more candidate scenario vectors, and (iii) select the specific scenario vector among the candidate scenario vectors by referring to the emergency circumstance information.

9. The method of claim 1, wherein, at the step of (c), the subject vehicles (i) calculate the interference scores in relation to the specific emergency vehicle by referring to at least part of (i 1) a combination of distance information between the specific emergency vehicle and each of the subject vehicles and differential information on the distance information, and (i 2) gap information between the emergency reaction command and each of actual driving actions of the specific emergency vehicle, and (ii) transmit the interference scores to the management server.

10. The method of claim 1, further comprising a step of:
(d) the management server, if a time of at least part of the interference scores being maintained as larger than the second threshold is larger than a fifth threshold, (i) generating another metadata of the specific emergency vehicle at that timing, (ii) generating another emergency reaction command for that timing by referring to said another metadata, and (iii) transmitting said another emergency reaction command for another subject vehicles for that timing,
wherein said another metadata, said another emergency reaction command and said another subject vehicles in the step of (d) correspond to the timing later than that of the steps of (a) to (c).

11. A management server for detecting one or more emergency vehicles in real time, and managing one or more subject vehicles to support the emergency vehicles to drive without interferences from the subject vehicles by referring to detected information on the emergency vehicles, comprising:
at least one memory that stores instructions; and
at least one processor configured to execute the instructions to perform processes of: (I) if emergency circumstance information on at least one specific emergency vehicle among the emergency vehicles is acquired through at least part of one or more sensors in at least part of one or more connected vehicles, including the subject vehicles, interworking therewith, generating metadata on the specific emergency vehicle by referring to the emergency circumstance information; (II) (i) generating at least one circumstance scenario vector by referring to the emergency circumstance information and the metadata, (ii) comparing the circumstance scenario vector with one or more reference scenario vectors in a scenario database ("DB"), to thereby find at least one specific scenario vector whose similarity score with the circumstance scenario vector is larger than a first threshold, and (iii) acquiring an emergency reaction command by referring to the specific scenario vector; and (III) transmitting the emergency reaction command to each of the subject vehicles whose relationship with the specific emergency vehicle satisfies a specific condition, to thereby support the specific emergency vehicle and the subject vehicles to drive while controlling their interference scores for each other to be smaller than a second threshold.

12. The management server of claim 11, wherein, at the process of (I), the processor selects one or more reference vehicles, to be used for generating at least part of the metadata, among the connected vehicles, whose relationship with the specific emergency vehicle satisfies at least one of a direct interaction condition and an indirect interaction condition, and estimates at least one location of the specific emergency vehicle by referring to relative coordinates representing relative locations among the reference vehicles and the specific emergency vehicle, to thereby generate said at least part of the metadata.

13. The management server of claim 12, wherein, at the process of (III), the processor selects the subject vehicles, among the connected vehicles, whose distances from the specific emergency vehicle are smaller than a third threshold so that the specific condition is satisfied, by referring to the estimated location of the specific emergency vehicle.

14. The management server of claim 12, wherein, at the process of (I), (i) one or more first reference vehicles, among the reference vehicles, which satisfy the direct interaction condition, estimate relative locations of the specific emergency vehicle therefrom by using at least part of their one or more image sensors, one or more radar sensors and one or more Lidar sensors, to thereby generate one or more specific emergency vehicle relative coordinates among the relative coordinates, (ii) one or more second reference vehicles, among the reference vehicles, which satisfy the indirect interaction condition, estimate relative locations of the first reference vehicles therefrom by using at least part of their one or more image sensors, one or more radar sensors and one or more Lidar sensors, to thereby generate one or more first reference vehicle relative coordinates among the relative coordinates, and (iii) the first and the second reference vehicles transmit the relative coordinates to the management server.

15. The management server of claim 14, wherein the processor performs a process of (i) generating one or more first specific emergency vehicle absolute coordinates based on the first reference vehicles by referring to absolute coordinates of the first reference vehicles and their corresponding specific emergency vehicle relative coordinates, (ii) generating one or more second specific emergency vehicle absolute coordinates based on the second reference vehicles by referring to absolute coordinates of the second reference vehicles, their corresponding first reference vehicle relative coordinates and their corresponding specific emergency vehicle relative coordinates, and (iii) estimating said location of the specific emergency vehicle by referring to at least part of the first specific emergency vehicle absolute coordinates and the second specific emergency vehicle absolute coordinates.

16. The management server of claim 11, wherein, at the process of (I), the processor transmits an alarm to at least part of specific connected vehicles and specific connected pedestrians located closer than a fourth threshold from the specific emergency vehicle.

17. The management server of claim 11, wherein, at the process of (I), at least part of the emergency circumstance information is generated by neural networks processing a specific image including the specific emergency vehicle, wherein, on condition that (i) a first neural network, among the neural networks, has applied at least one first Convolutional Neural Network (CNN) operation to the specific image in order to determine whether the specific image has a global visional feature corresponding to the specific emergency vehicle or not, to thereby generate first decision information, (ii) a second neural network, among the neural networks, has applied at least one second CNN operation to a prescribed specific region of the specific image in order to determine whether the specific image has a local visional feature corresponding thereto or not, to thereby generate second decision information, and (iii) a third neural network, among the neural networks, has applied at least one third CNN operation to the prescribed specific region thereof in order to determine whether the specific image has a local temporal feature corresponding thereto or not, to thereby generate third decision information, said part of the emergency circumstance information is generated by referring to the first to the third decision information.

18. The management server of claim 11, wherein, at the process of (II), the processor (i) maps location information of the specific emergency vehicle and the subject vehicles onto a virtual plane by referring to the metadata, to thereby generate the circumstance scenario vector, (ii) calculates similarity scores between the circumstance scenario vector and each of the reference scenario vectors, to thereby select one or more candidate scenario vectors, and (iii) select the specific scenario vector among the candidate scenario vectors by referring to the emergency circumstance information.

19. The management server of claim 11, wherein, at the process of (III), the subject vehicles (i) calculate the interference scores in relation to the specific emergency vehicle by referring to at least part of (i-1) a combination of distance information between the specific emergency vehicle and each of the subject vehicles and differential information on the distance information, and (i 2) gap information between the emergency reaction command and each of actual driving actions of the specific emergency vehicle, and (ii) transmit the interference scores to the management server.

20. The method of claim 11, wherein the processor further performs a process of:
(IV) if a time of at least part of the interference scores being maintained as larger than the second threshold is larger than a fifth threshold, (i) generating another metadata of the specific emergency vehicle at that timing, (ii) generating another emergency reaction command for that timing by referring to said another metadata, and (iii) transmitting said another emergency reaction command for another subject vehicles for that timing,
wherein said another metadata, said another emergency reaction command and said another subject vehicles in the step of (d) correspond to the timing later than that of the steps of (a) to (c).

\* \* \* \* \*